Oct. 7, 1930.  W. C. RATH  1,777,449
PROCESS OF PRODUCING GAS FROM GARBAGE
Filed May 19, 1923   7 Sheets-Sheet 1
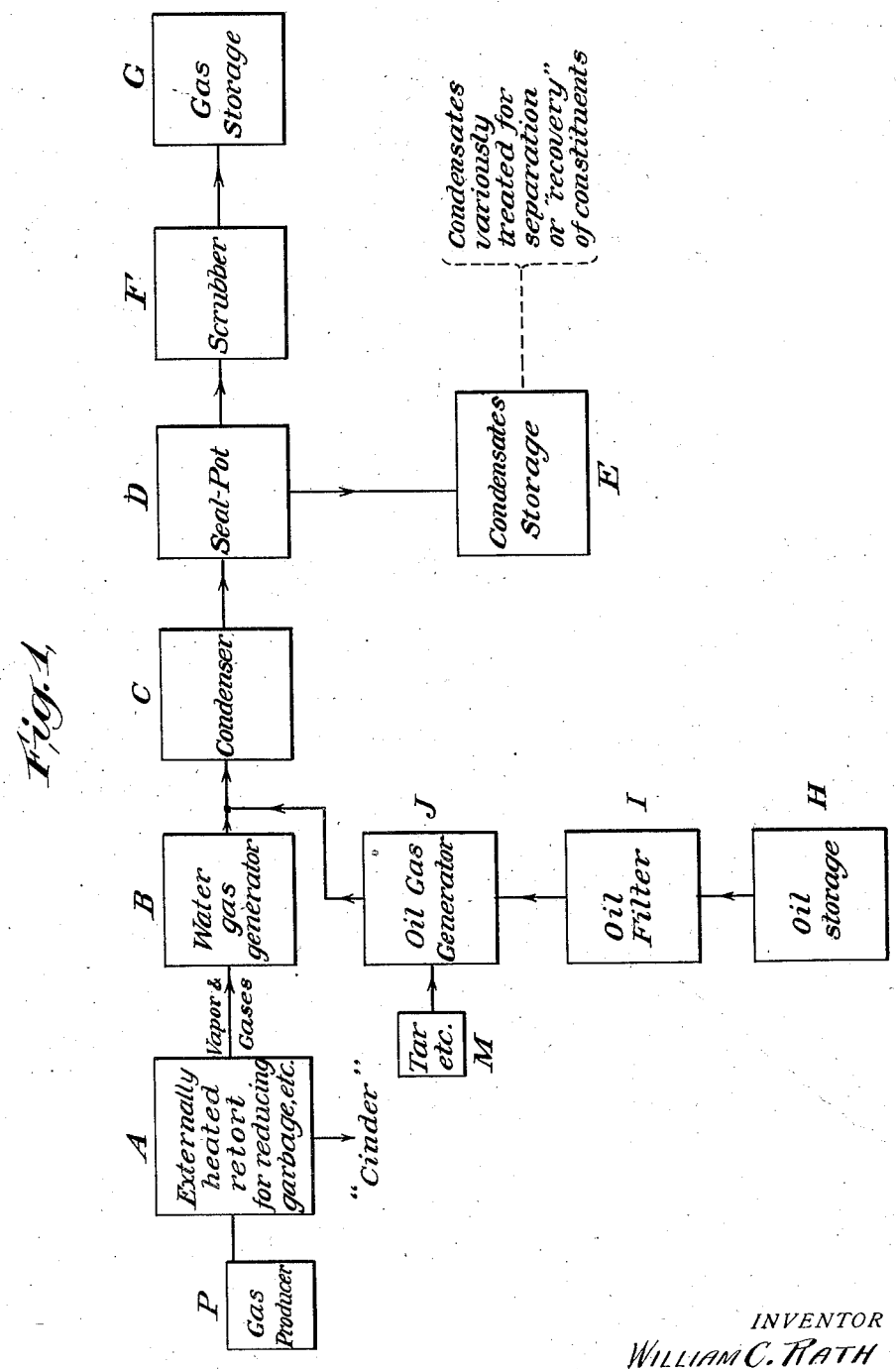
INVENTOR
WILLIAM C. RATH
BY
ATTORNEYS

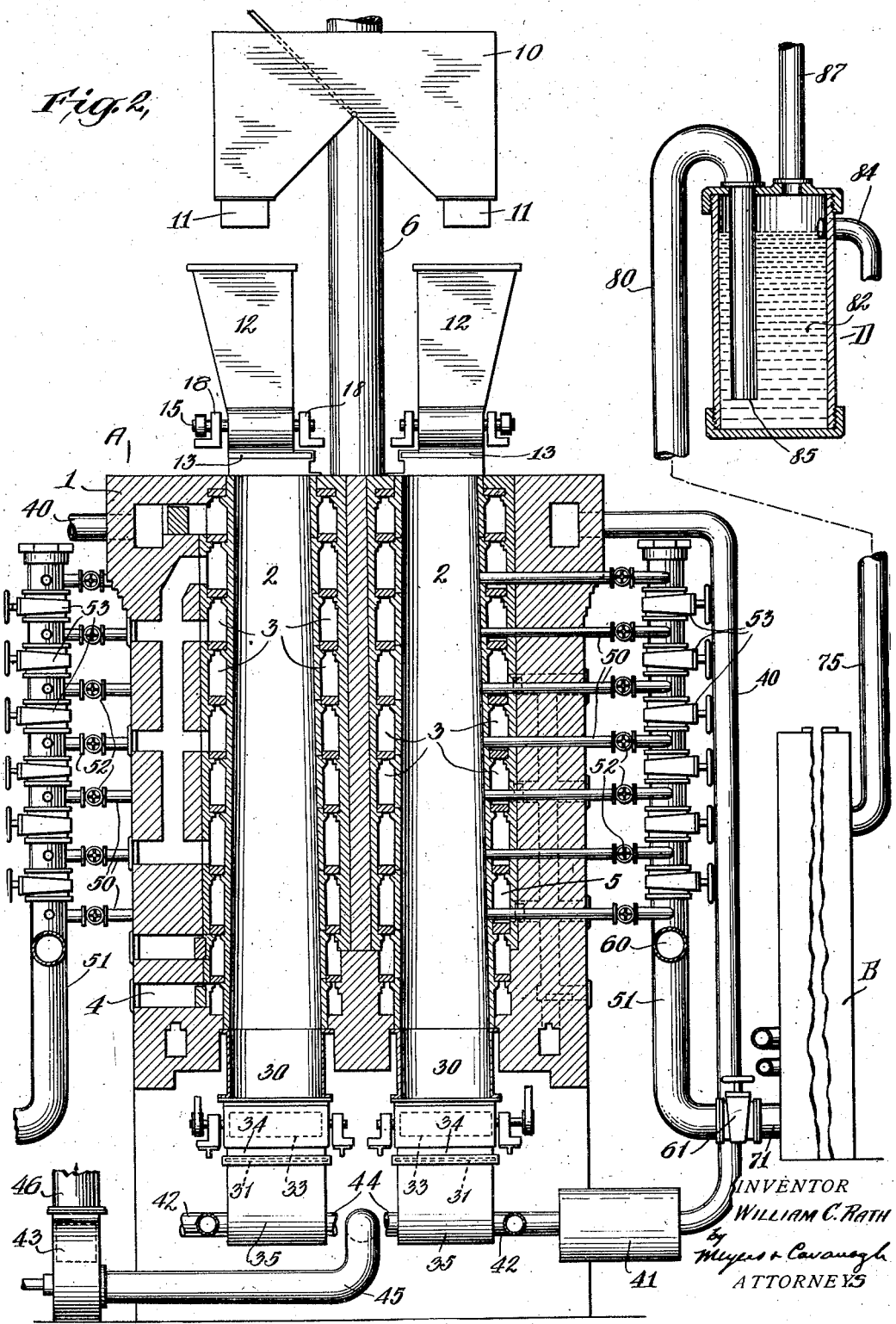

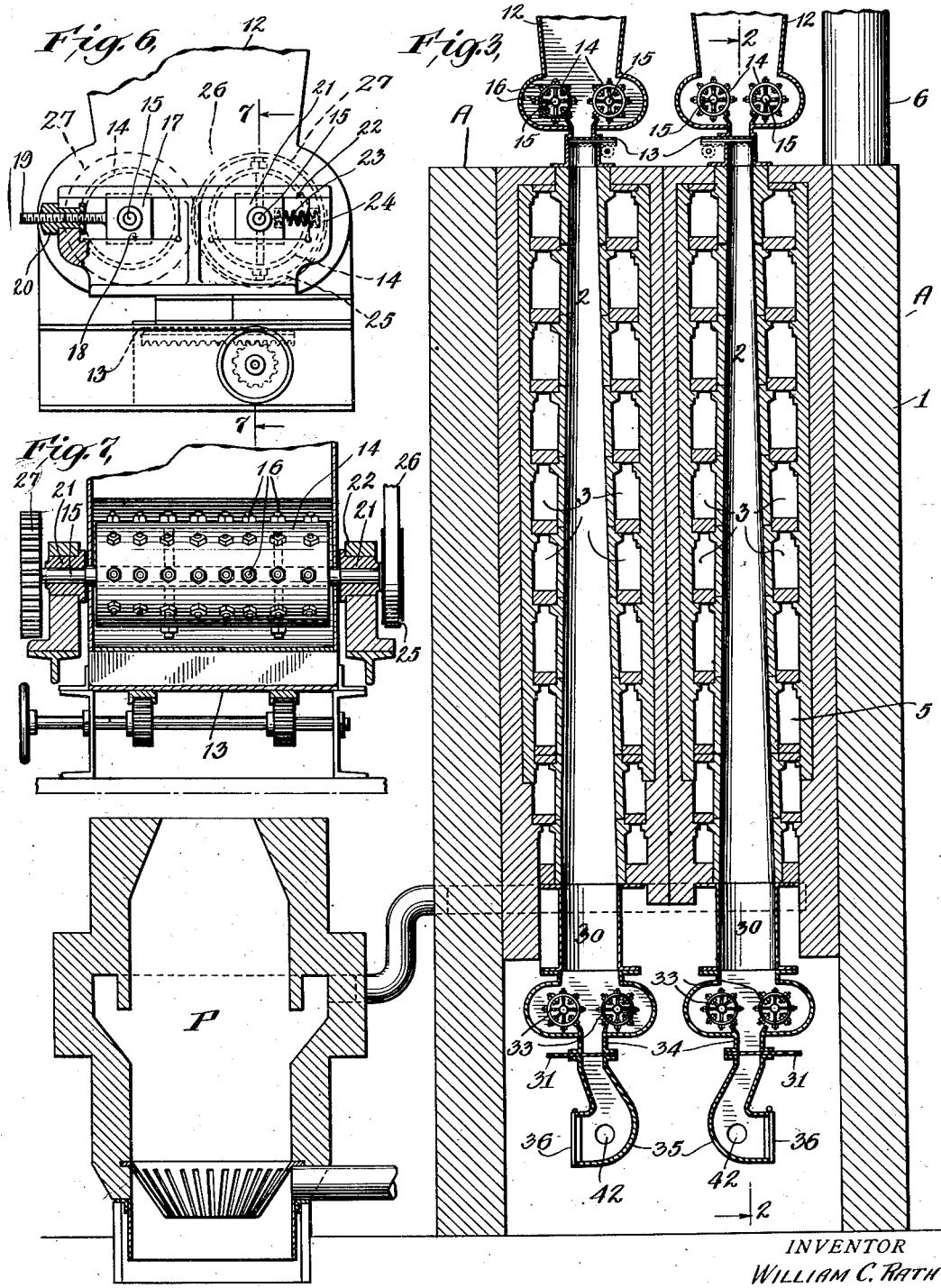

Oct. 7, 1930.  W. C. RATH  1,777,449
PROCESS OF PRODUCING GAS FROM GARBAGE
Filed May 19, 1923    7 Sheets-Sheet 4
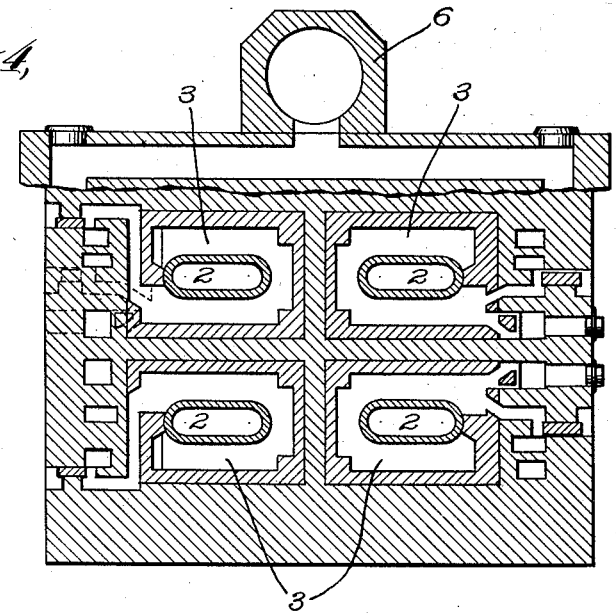
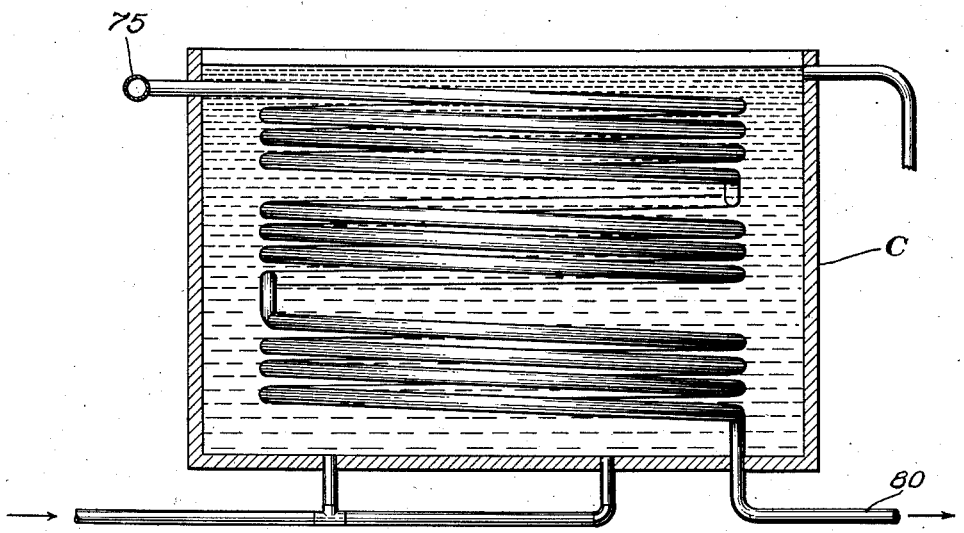
INVENTOR
WILLIAM C. RATH
BY
ATTORNEYS

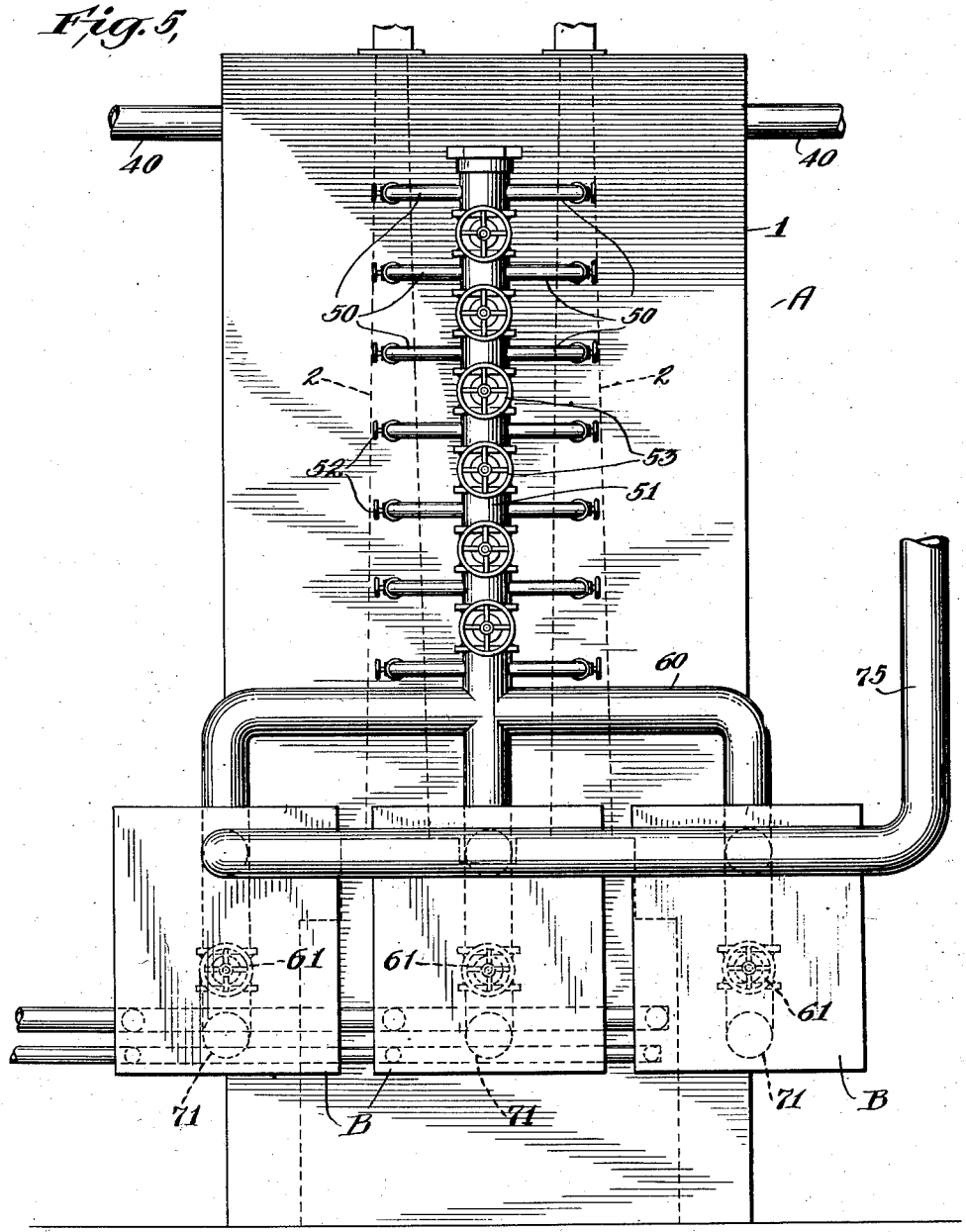

Oct. 7, 1930.  W. C. RATH  1,777,449
PROCESS OF PRODUCING GAS FROM GARBAGE
Filed May 19, 1923   7 Sheets-Sheet 6

INVENTOR
WILLIAM C. RATH
BY
ATTORNEYS

Oct. 7, 1930.  W. C. RATH  1,777,449
PROCESS OF PRODUCING GAS FROM GARBAGE
Filed May 19, 1923   7 Sheets-Sheet 7
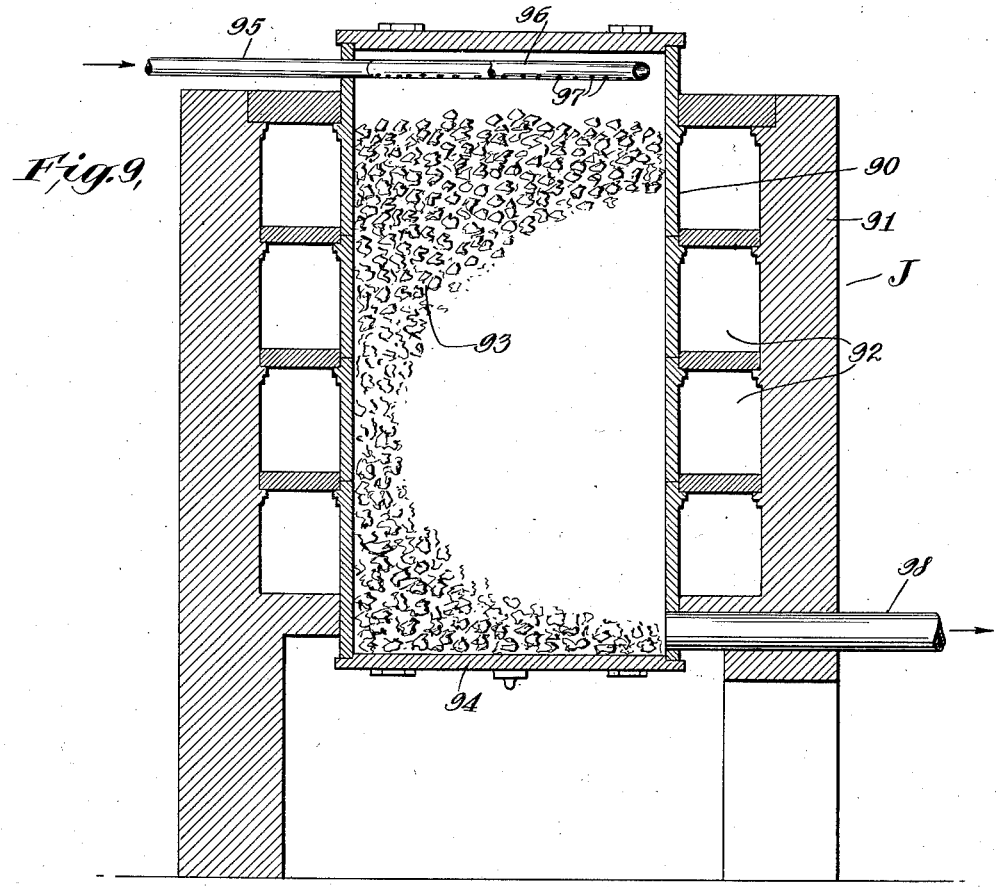
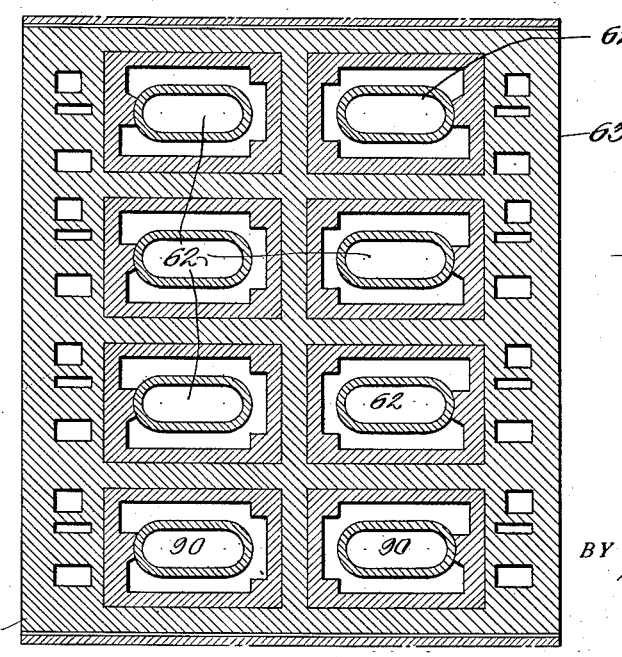
INVENTOR
WILLIAM C. RATH
BY
Meyers + Cavanagh
ATTORNEYS Patented Oct. 7, 1930

1,777,449

UNITED STATES PATENT OFFICE

WILLIAM C. RATH, OF NEW YORK, N. Y.

PROCESS FOR PRODUCING GAS FROM GARBAGE

Application filed May 19, 1923. Serial No. 640,052.

My invention relates to processes for producing gas from garbage and similar carbonaceous material with the recovery of all or substantially all of the valuable components of the material as merchantable products.

An important object of the invention is to destructively distil garbage and similar carbonaceous material (sufficiently referred to hereafter collectively as the raw material) at moderate temperatures and under such conditions that the moisture and volatilizable components are vaporized and driven off without regard to the conversion of the fixed carbon content to any material extent, since the fixed carbon may remain with the dry residue or cinder. A further object is to utilize the energy carried over by the water vapor and gasified volatiles, and to further treat the water vapor and gasified volatiles and especially the volatiles contained in the gases as a preferably independent operation, with incandescent carbon at a relatively high temperature to crack or permanently gasify the water vapor and most of the volatiles and produce fixed gas having substantially the characteristics of water gas enriched by hydrocarbons and volatiles, oils and other components derived from the raw material, this gas being more or less "enriched", or of a high grade and merchantable for heating, illumination or other purposes.

To these ends, the invention provides for the conversion of garbage and analogous materials by distillation at relatively low temperatures, substantially at or above 400° C., under conditions so controlled that the rate of distillation and maximum average temperature applied are adapted to produce volatile distillates suitable for enrichment of light and power gas, and the distillates are then united with such gas from a suitable source. This gas may profitably be produced, in one example of the invention, by a further treatment of the raw material moisture content along with the distillates.

The process in one preferred form, as briefly described, comprises the destruction of garbage or analogous raw material in a suitable retort, which preferably is a vertical retort for reasons hereafter evident, by heat externally applied and without internal combustion, the average temperature being in a particular instance 400° C. or greater and the rate or intensity of the distillation process being such that all of the water content is vaporized and discharged from the retort without coming to any substantial extent in contact with incandescent portions of the charge and by reason of this condition the fixed carbon content of the material is not combined to any appreciable or considerable extent with the water vapor; by this I do not mean that there is no contact or conversion, as that would practically be difficult if not impossible. I mean that no special reliance is placed on this fixed carbon to convert the water vapor, that no special effort is made to consume the carbon, that the temperature of the retort is adjusted with regard to other considerations than the reaction $C+H_2O = CO+H_2$. At the same time most of the tars, oils and other volatilizable components are vaporized and discharged along with the water vapor. Some of the just stated components are converted into fixed gases in the retort and others are only vaporized and not converted into fixed gaseous form, and these unfixed portions are subjected to further treatment to convert a part of them into fixed gases as described hereafter. The residue in the retort consists of dry solids or cinder generally containing a large proportion or by far the greater proportion of the fixed carbon content of the raw material, along with materials valuable for fertilizer and other purposes, as hereafter described. The total gases, including water vapor, permanently cracked or vaporized distillates and condensible volatiles, are then further treated in a suitable apparatus, conveniently termed a superheater, containing carbon such as coke or a suitable coal, without combustion and with externally supplied heat sufficient to maintain the carbon in a glowing or incandescent condition and preferably at a higher temperature than that of the first operation. By contact with the glowing carbon the water vapor is decomposed and the oxygen content combines with the carbon while at the same time the condensible volatiles (tars and oils) are broken up, and either cracked or permanently dissociated, or else decomposed by reaction with the water, producing substantially an enriched water gas, the enriching ingredients of which are hydrocarbons, oils, and other volatilizable components of or derived from the raw material. The resulting gas is then subjected to further treatment, usually being passed through a condenser to separate out any materials such as a fraction of the original tars not completely gasified, or ammonia, acetic acid, and the like. This condensate is collected and treated in any suitable way for the recovery or utilization of its components. The resulting gas is "scrubbed" and stored for sale or use. When desired the gas is additionally enriched by suitable hydrocarbons from other sources.

The characteristics and advantages of the invention are further sufficiently described in connection with the following detail description of the accompanying drawings, which show certain representative forms of apparatus embodying the invention and also sufficiently illustrate representative performances of the process. After considering these exemplifications, persons skilled in the art will understand that many variations may be made within the scope of the invention, and I do not limit myself to details except as claimed hereafter.

Figure 1 is a schematic view or flow sheet graphically explaining the process and illustrating diagrammatically a suitable apparatus or installation embodying the structural features of the invention in one form.

Figure 2 is a longitudinal section of a suitable multiple retort, also showing other parts of the apparatus in operative relation thereto but not necessarily in their normal or preferred positions.

Figure 3 is a vertical transverse section of the retort.

Figure 4 is a horizontal section of the same.

Figure 5 is a front elevation of the retort and superheaters.

Figure 6 is an enlarged detail in side elevation of a charging device.

Figure 7 is a section of the same.

Figure 9 is a vertical section of a suitable oil gas generator.

Figure 10 is a plan view of a suitable combined setting for superheaters or water gas generators and one or more oil gas generators.

Figure 11 is a vertical section of a suitable condenser.

Figure 8:
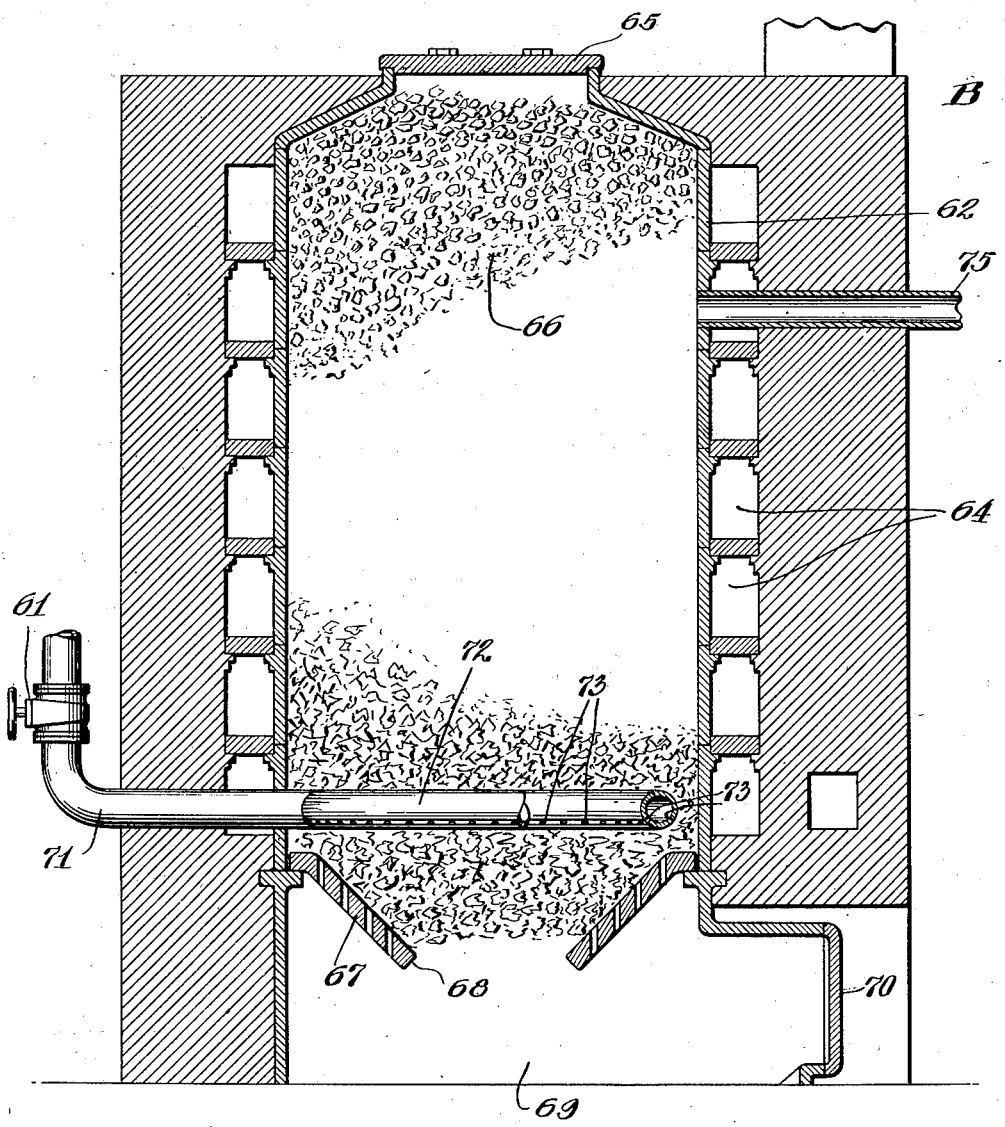
Figure 8 is a vertical section of a suitable superheater or water gas generator.

The complete process is diagrammatically represented in Figure 1. A suitable retort, which is preferably a suitable setting containing a plurality of individual retorts A, is fired or heated by any suitable means, conveniently by fuel gas from any suitable gas producer gas outfit P. The producer gas or other fuel gas properly mingled with air passes through flues in the retort setting about the individual retorts which are charged with wet garbage or analogous carbonaceous material, and a suitable average temperature depending on the material being treated but usually in the neighborhood of 400° C. is maintained, for such time (as sufficiently particularized hereafter) as to destructively distill the raw material. Since garbage is an almost universally available material and the process is especially adapted for the destruction and conversion of garbage, that will be hereinafter referred to specifically as the raw material, with the understanding that the invention is not limited to the conversion of any particular or usual kind of garbage but may be employed for reducing or converting other cheap or waste materials which are capable of being treated in a similar fashion. This distillation is conducted, by externally applied heat and substantially without internal combustion, preferably in such a way that as much as possible of the water and condensible and noncondensible volatiles in the garbage are gasified without bringing any large part of the water vapor in contact with the glowing or incandescent fixed carbon left by the garbage in the retorts, and consequently without the conversion of any considerable part of the water into water gas and without reference to the consumption of any material part of the fixed carbon content of the garbage. The residue which drops to the bottom of the retorts is a dry solid or cinder, which may and preferably does contain a large part or substantially all of the fixed carbon content of the raw material, and also contains potash, phosphate and other materials valuable for fertilizing and other purposes, and the complete cinder is in fact valuable as a fertilizer of high value without special treatment, although of course it may be treated, mixed or blended in various ways for separation, recovery or direct utilization of its components, as well understood in handling known materials in the fertilizer art.

The retort gases are conveyed to a superheater or water gas generator B containing suitable carbon such as coke or a suitable grade of coal. There may be one or more individual retorts or superheater units in the setting represented by B, in Figure 1, and each of them is charged with a suitable amount of the carbon, which is heated to red or incandescent temperature, preferably higher than A and approaching 700° C. or higher, by external means such as properly aerated producer gas. In the generator B the water vapour is dissociated and the oxygen content combines with the carbon with accompanying production of free hydrogen to form water gas while a large part of the condensible volatiles in the gases are dissociated, cracked or broken down by complicated reactions the nature of which is little understood, into gases which are largely permanent or fixed gases. The total gas is than conveyed to any suitable condenser C, in which any condensible portion of the gases not fixed in the reactions is separated. This condensate includes in the case of average garbage, alcohol, volatile acids and some tar or pitch together with considerable ammonia preferably removed by scrubbing, and in the case of other materials the condensate will vary and if the condensate is not considered of value its separation may be considered merely a preliminary operation which incidental cooling of the gas preparatory to washing or scrubbing. Usually the condensed liquid and gas are conveyed by a pipe to a suitable trap or seal pot D which is arranged to produce an oscillating or surging operation of the gas as it passes through the liquid seal, consisting of condensate therein, which is found to exert a beneficial effect on the operations performed in the still and the superheater, and the condensates are then conducted to a storage tank E and may be disposed of in any desired manner, for instance, it may be treated in various ways to separate its different components into merchantable products.

The gas is usually passed through a scrubber F to a gas storage tank G for any desired use or sale. The gas in the case of average garbage contains carbon dioxide, illuminants including ethylene and benzene, some free oxygen, a large amount of carbon-monoxide, methlylene, methane, free hydrogen and free nitrogen, and is substantially an enriched water gas in which the enriching agents are hydrocarbons, volatile oils, and other volatiles of the raw material. This is a high grade gas available in many cases without further treatment or enrichment for many purposes including heating and illumination. To give only one example of its utility it may be stated that it is especially valuable for metallurgical purposes since it is in most cases free from sulphur, and while ordinary water gas as heretofore produced is free from sulphur, it has not been produced to my knowledge on a practical or commercial scale from such materials or in such a way that it is enriched in the process of production and is valuable for such uses without further or additional expensive enrichment and in other words, as originally produced it has hitherto been a low grade gas requiring enrichment from other sources which materially adds to the cost of the gas.

By my process as above briefly described, a gas of high heating or illuminating value is produced in which the enriching ingredients are obtained from the waste or obnoxious raw material without added cost, and which are likewise adapted to cooperate in producing the water gas itself. The total value of the recovered products, which are usually substantially all the valuable ingredients of garbage or other raw material, is greatly in excess of the cost of operations. While it would be possible to use some or all of the gas produced by the process to provide the necessary heat for the process operations, it is preferable to provide heat from other more economical sources. For instance, when coal is used to make producer gas to furnish the necessary process heat, the cost of the coal is much less than the value of the merchantable gas produced in the process.

If it is desired to additionally enrich the gas product for any reason, the enrichment may be performed as a part of the complete process above outlined. For example, in a preferred performance of the process any suitable hydrocarbon may be supplied from a tank H to an oil gas generator J, or any suitable tar or analogous material may be supplied to the generator from a tank M, and this enriching material is properly cracked or dissociated in the oil gas generator and converted into a fixed gas which is conveyed through a suitable pipe and added in desired quantity to the gas produced from the garbage or other raw material, for instance, the enriching gas may be added at a point between the superheater B and the condenser C.

It is to be understood that suitable pumps may be provided wherever necessary in the apparatus as diagrammatically illustrated in Figure 1, or that certain parts of the apparatus may be located at suitable elevations to provide gravity flow of liquids or natural flow of the gases without pumping, also that suitable valves and other appurtenances may be provided as desired.

Figures 2 to 7 sufficiently illustrate one suitable form of retort apparatus, including a setting 1 of fire brick or other suitable material enclosing one or a plurality of individual vertical retorts 2, which are preferably of flattened or elongated form in cross section (Figure 4) and each retort is surrounded by properly arranged flues 3 for the passage of hot gases, and suitable gas control devices such as blocks of firebrick are provided to control the supply and flow of gases and to regulate temperature conditions substantially as usually in gas retorts and analogous apparatus. A suitable fuel gas is supplied from any source such as a gas producer gas outfit P, Figure 3. Air is usually admitted to lower portions of the flues, as substantially at 4, Figure 2, and is superheated in the lower flue passages and then comes in contact with gas which is admitted at about the level 5, Figure 3, and the gas is ignited and burned in the ascending flue passages about the retorts, producing a temperature of approximately 400° C., or a higher temperature, at about the lower central zone of the retorts, the temperature decreasing upwardly and the burned gases or a portion of them are then led through suitable flues to the stack 6.

Garbage or other suitable raw material may be supplied to the retorts in any convenient manner. Desirably, as shown in the present example, the garbage is dumped into or stored in elevated bins 10 provided with gates or valves at the spouts 11, which are located above hoppers 12, one for each retort. Each hopper is provided with a gate or valve 13 with suitable operating mechanism, and the garbage may be permitted to pass by gravity in the retort when the gate is open. Usually, however, a special or positive charging device is provided as exemplified herein by feed rolls 14 mounted on shafts 15 and having corrugated or spiked surfaces, represented in this example by bolts 16 inserted in the roll peripheries at suitable intervals and secured by nuts. To allow for the proper charging of different classes of materials the rolls are desirably made adjustable or movable toward and from each other. One of the roll shafts 15 for this purpose may be carried in movable bearing blocks 17 mounted in guides 18 and the blocks adjusted by screws 19 and nuts 20. Desirably also, one of the rolls is yieldably mounted, for example, by arranging its shaft 15 in movable bearing blocks 21 located in guides 22, with springs 23 arranged between the bearing blocks and abutments 24 to hold the yieldable roll normally in the position shown in Figure 6. When any large bone or bulky object or mass passes the rolls the movable roll may yield back sufficiently to permit its passage. Any suitable driving means may be provided for the charging rolls, as sufficiently represented by a pulley 25 and belt 26, Figure 7, and the roll shafts 15 of each pair may be suitably connected, as by gears 27.

As the garbage is distilled or converted it passes progressively downward until near the bottom of the retorts there is a dry residue or cinder. Desirably each retort has a lower chamber or extension 30 to accommodate the cinder. Any suitable gate may be provided, such as a gate 31 to control the discharge of the cinder by gravity. It is, however, usually desirable to provide positive discharging means such as rolls 33, which may be substantially similar to the charging rolls 14 above described, and may be mounted and driven in a similar or any suitable way. In this case a discharge or any suitable way. In this case a discharge spout 34 is provided, leading from the space between the discharging rolls, and the valve or gate 31 as located in the spout. While the cinder is partially cooled and more or less quenched when it reaches the gate, and may be discharged in that condition, it is desirable to additionally cool or quench the cinder so that it may be conveniently handled.

For this purpose quenching chambers 35 are desirably provided, arranged as extensions of the spouts 34. Each chamber may be in substantially curved or L shape as shown, and may be provided with a gate 36, which may have any suitable fastening means. To effectively cool and quench the cinder in the quenching chambers a part of the burned flue gas is drawn from an upper portion of the flue passages through a pipe 40, Figure 2, and may be passed through any suitable cooler 41 and then by any suitable manifold arrangement, portions of the cooled flue gas are introduced to the quenching chambers through pipes 42. To insure the proper flow of the quenching gas, a suction blower or exhauster 43 may be provided, Figure 2, driven in any suitable way, for instance, by an individual electric drive, and the flue gases are drawn by the exhauster from the quenching chambers through pipes 44 and any suitable mains or manifold 45 and then discharged through a pipe 46 to atmosphere or to the stack.

The described construction and arrangement provides for continuous operation of each individual retort as well as for continuous operation of a plan including a plurality of the individual retorts. The gates or valves below the charging and discharging rolls may be kept normally open and the rolls may be driven at a fixed rate so that the raw material is continuously supplied to the top of the retort and passes gradually down and the dry residue is continuously discharging at the bottom into the quenching chamber. The upper valve below the charging rolls may be closed for a brief time when it is desired to charge the hopper and the lower valve, below the discharging rolls may be closed for a very brief time while burned flue gas is admitted to the quenching chamber just before the quenching chamber is emptied. The continuous operation of the individual retort unit not only avoids loss of time in intermittent operation, but avoids a great waste of heat since there is no necessity for discontinuing the supply of heat and then again firing the retort to bring it and a fresh mass of unheated raw material up to normal operating temperature.

Provision is desirably made for taking off gas or vapor from the retorts at different levels. For this purpose Figure 2 shows a plurality of discharge pipes 50 in vertically spaced relation, entering the retorts at different levels. These pipes lead to a vertical main or manifold 51 and conveniently a single main may be placed at each side of the retort setting and may then serve two of the retorts, the discharge pipes 50 of the two retorts being led into the same manifold. Each discharge pipe is desirably provided with a valve 52 and the manifold or main desirably has valves 53 arranged between the different discharge pipe levels, to block off unused portions of the main. Valves 52 may be manipulated to insure the discharge of the gas and vapour from the retort at the proper level and usually the valves are controlled so that the gases are driven off without passing in contact to any considerable extent with red or incandescent carbon in the hot zone of the retort, for reasons explained above. In some cases, however, when it is desired to intensify the cracking process which takes place to some extent in the retort especially in connection with some of the volatile components, even if it is incidentally necessary to dissociate a part of the water vapor, the valves may be adjusted to discharge the gases at a lower level. The described multiple retort and valve arrangement provides for the convenient and continuous operation of the unit. For instance, valves 52 and also manifold valves 53 may be properly adjusted to shut off one of the retorts while it is being repaired, or charged, or brought up to the proper temperature. The proper manipulation of the valves and conduct of other operations for continuous production will be sufficiently understood without further detailed explanation.

The gas and vapour produced in the retorts is led from the main 51 to one or a battery of superheaters which may be otherwise described as water gas generators, B, Figures 2 and 5. There may be a group of the superheaters corresponding to each of the mains as sufficiently illustrated in Figure 5 and to control the flow of gases to the individual superheaters the main is provided at its lower end with a horizontal branch or manifold 60 and suitable valves 61. Each superheater casing may contain a single retort or superheater chamber, or as shown in Figure 10, a plurality of retorts 62 may be arranged in a single casing or setting 63. Whatever the arrangement, the individual retorts as sufficiently shown in Figure 8 are surrounded by suitable flue passages 64 and heat is supplied substantially in the fashion described with reference to the main retorts to heat the superheaters to the required temperature. Each retort has a gas-tight cover 65 provided with any suitable quickly operated fastenings. The retort is charged with any suitable carbon in fragments of moderate size, for example, coke or a suitable coal. The carbon mass rests on a grate structure 67 which usually has an opening 68 to permit the gradual fall of the ash into a pit 69 from which it may be removed through a gas-tight door 70 having any suitable quickly operable fastenings. The gases from the main retorts are conveyed into the superheater through a pipe 71 and discharged in any suitable way near the bottom of the incandescent carbon charge. For instance, the pipe 71 desirably has a circular header 72 provided with nozzles or perforations 73 in its lower face to prevent these nozzles becoming clogged with carbon or ash. The complex gas from the main retorts then rises through the glowing carbon and the water vapor is dissociated and the oxygen content thereof combines with carbon to form carbon-monoxide, with accompanying production of free hydrogen to form water gas, while the volatiles which were not cracked or converted into fixed gases in the main retorts are to a great extent so converted by the heat of the superheater. The total resulting gas is then discharged through a pipe 75 to condenser C, Figure 1, which may be any known or suitable condenser, to separate any condensible materials, such as tars and oils, from the gases, as sufficiently described above. In some cases the condenser may be omitted. The liquid and gas is then conveyed through a pipe 80 to liquid seal or seal pot D, Figures 1 and 2. This contains liquid (condensate) 82 up to a suitable level and accumulating condensate is taken off through a pipe 84 to the storage tank E, Figure 1. Pipe 80 discharges in the seal pot 85 well below the level of the liquid and this arrangement produces a bubbling, surging or oscillating movement of the gas, which amplifies or facilitates the operations conducted in the main retorts and superheaters. The fixed gas passes from the seal pot through a pipe 87 to any known or suitable scrubber and so to the storage tank G.

The individual superheating retorts may be operated continuously, that is to say, they may be charged with fresh carbon and the ash may be discharged continuously at a slow rate, or intermittently without interruption of the treatment of gases therein by providing any suitable valves or hoppers similar to the devices provided for the main retorts.

When it is desired to additionally enrich the gas in ways and for reasons above explained, a suitable oil generator J, Figures 1 and 9 is provided. This may vary greatly in character, but desirably as shown in Figure 9 it comprises a retort 90 enclosed in a suitable casing or setting 91 provided with flue passages 92 and heated substantially in the way described in the main retorts or in any other suitable fashion. The retort is desirably filled with broken brick or any other suitable mineral lumps 93 which rest on a gate 94 provided with any suitable fastenings and substantially gas-tight. Any suitable oil, tar or other enriching material is supplied through a pipe 95 to a ring heater 96 provided with perforations 97 from which the oil is discharged and flows down in a film of large area over the lump contents of the still and is heated, vaporized and rendered into a fixed gas which passes out through a pipe 98 and is added in desired quantity to the gases produced in the main process as sufficiently explained hereinabove. Any suitable tar, mineral oil or other volatile hydrocarbon may be used as the additional enriching material.

Having described in some detail one exemplary method for carrying out my process for treating garbage waste, and suggested various modifications thereof, it will be apparent to anyone skilled in the art that it is profitably applicable to many other forms of waste, such as slaughterhouse waste, centrifuged distillery slops, spoiled grain, coagulated sewage, manure, extracted dye woods, and the like, either alone or mixed with more or less material of lower water content, all of which may generically be called "garbage". Also it will be apparent that the temperatures used, treatment and disposal of gaseous products, as well as the handling and blending of solid residues, may (and indeed should) be considerably varied to suit the requirements of the particular kind of garbage and the particular market and local conditions, without departing from the spirit of my invention.

I claim:

The process of producing a gas enriched by the volatilized components of the carbonaceous material of garbage, which comprises treating the material in a closed retort by heat applied externally of the retort and out of contact with the material and in such manner as to produce a zone of temperature of about 400° F, near the bottom of the retort to substantially eliminate internal combustion, discharging the resulting cinder at the bottom of the retort, and the resulting distillation vapors including water vapor and hydrocarbon volatiles above the level of highest temperature, thereby to eliminate any substantial decomposition of said vapors and volatiles in the retort, subjecting the distillation vapors after they are withdrawn to the action of incandenscent carbon, condensing out portions of the distillation vapors, and storing the remaining fixed gas composed substantially of water gas enriched by volatilized components of the garbage.

Signed at New York in the county of New York and State of New York, this 18th day of May, A. D. 1923.

WILLIAM C. RATH.